(12) United States Patent
Peltonen

(10) Patent No.: US 6,578,384 B1
(45) Date of Patent: Jun. 17, 2003

(54) ARRANGEMENT IN A GLASS BENDING OVEN

(75) Inventor: Esko Peltonen, Kangasala (FI)

(73) Assignee: Glassrobots Oy, Tampere (FI)

( * ) Notice: Subject to any disclaimer, the term of this patent is extended or adjusted under 35 U.S.C. 154(b) by 0 days.

(21) Appl. No.: 09/831,748
(22) PCT Filed: Nov. 12, 1998
(86) PCT No.: PCT/FI98/00882
§ 371 (c)(1), (2), (4) Date: May 14, 2001
(87) PCT Pub. No.: WO00/29340
PCT Pub. Date: May 25, 2000

(51) Int. Cl.[7] .............................................. C03B 23/023
(52) U.S. Cl. .............................. 65/273; 65/107; 65/287; 65/289; 65/291
(58) Field of Search ........................ 65/273, 287, 107, 65/289, 291

(56) References Cited

U.S. PATENT DOCUMENTS

| | | | | |
|---|---|---|---|---|
| 3,249,415 A | * | 5/1966 | McMaster et al. | 65/273 |
| 4,497,645 A | * | 2/1985 | Peltonen | 65/273 |
| 4,518,410 A | * | 5/1985 | Brokmueller | 65/107 |
| 5,071,461 A | | 12/1991 | Hirotsu et al. | |
| 5,501,717 A | * | 3/1996 | Vehmas | 65/273 |
| 5,876,477 A | * | 3/1999 | Bennett et al. | 65/273 |

FOREIGN PATENT DOCUMENTS

| | | |
|---|---|---|
| EP | 0 132 701 | 2/1985 |
| EP | 0 568 053 A1 | 11/1993 |
| EP | 0 592 862 A1 | 4/1994 |
| EP | 0 736 498 A2 | 10/1996 |

OTHER PUBLICATIONS

Patent Abstracts of Japan, No. 6, JP 57–140325, Aug. 30, 1982.

* cited by examiner

*Primary Examiner*—James Derrington
(74) *Attorney, Agent, or Firm*—Larson & Taylor PLC

(57) ABSTRACT

An arrangement in the loading end of a multi-section glass bending furnace, where the glass sheets travel along a special rail from one furnace section to the next section in mould carriages (8) moving in cycles on the said rail. For unloading and loading the mould with the bent glass (10) resting on it is shifted in mould carriage (8) from the rail over to side station (7), while the carriage keeps moving forward on the rail. There is in or will be removed to said rail from the side station one or more moulds earlier brought from the rail. In the side station the first transmitter (5) is to take the mould out of the mould and the second transmitter (6) is there to take the mould to the carriage and both transmitters are operating with the furnace section.

6 Claims, 1 Drawing Sheet

ARRANGEMENT IN A GLASS BENDING OVEN

This invention relates to an. arrangement in a glass bending furnace in accordance with the preamble of claim 1 by means of which arrangement formation of glass sheet unloading and glass sheet loading times are prevented as capacity restricting factors.

Previously known are so called serial type bending furnaces, where the glass sheets move for bending on the upper rail and the bent ones back to the loading and reloading place along the lower rail either in carriages with side walls or in open carriages. In these arrangements both the removal of a bent glass sheet and placing a straight blank in the mould are carried out while said carriage is standing still in the lower part of the so called loading lift.

The circulation time of carriage vertical motions including horizontal motions, lift motions, function of side members etc. typically take ab. 30 sec. Then the carriage is immobile in the lower part of said loading lift depending on the capacity of furnace each time. For instance, at a capacity of n pieces/h the time of standing still is (3600 sec)/n−30 sec.

If, for instance, the required furnace capacity is 60 pieces/h, then there will remain altogether 30 sec time (=15 sec.+15 sec.) for unloading and loading. In this case loading and unloading can still be carried out successfully by experienced persons, but two persons would be needed.

However, if one wants to increase the capacity to a quantity of 100 pieces/h, for instance, the so called cycle length will be 36 sec. and altogether 36 sec.−30 sec.=6 sec. time will remain for loading and unloading, the job is then impossible.

The arrangement as per this invention eliminates the top limit of lifting capacity caused by the loading and unloading procedures.

The invention is characterized in what is presented in the claims.

By means of the arrangement one is not tied to the cycle length in the manner that unloading from and loading into the mould carriage should be carried out within that time. Thanks to the arrangement the capacity of furnace can be increased substantially from known rates of 30–70 pieces per hour in present serial furnaces to a rate of 100–120 pieces per hour. By means of the arrangement both bent glass sheets and straight glass sheets to be loaded into the furnace are more easily handled than the ones today, because the moulds are better pulled forward for the period of glass sheet replacement in a special workplace for glass sheet changing.

Figure 1:
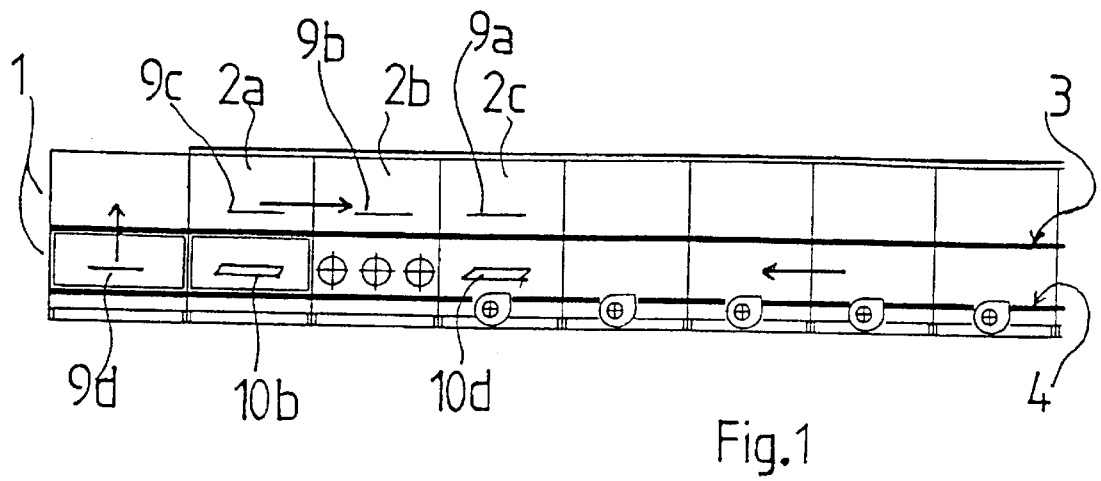

In the following the invention is disclosed with reference to the enclosed drawing, where FIG. 1 is a schematic side view of a furnace embodiment.

Figure 2:
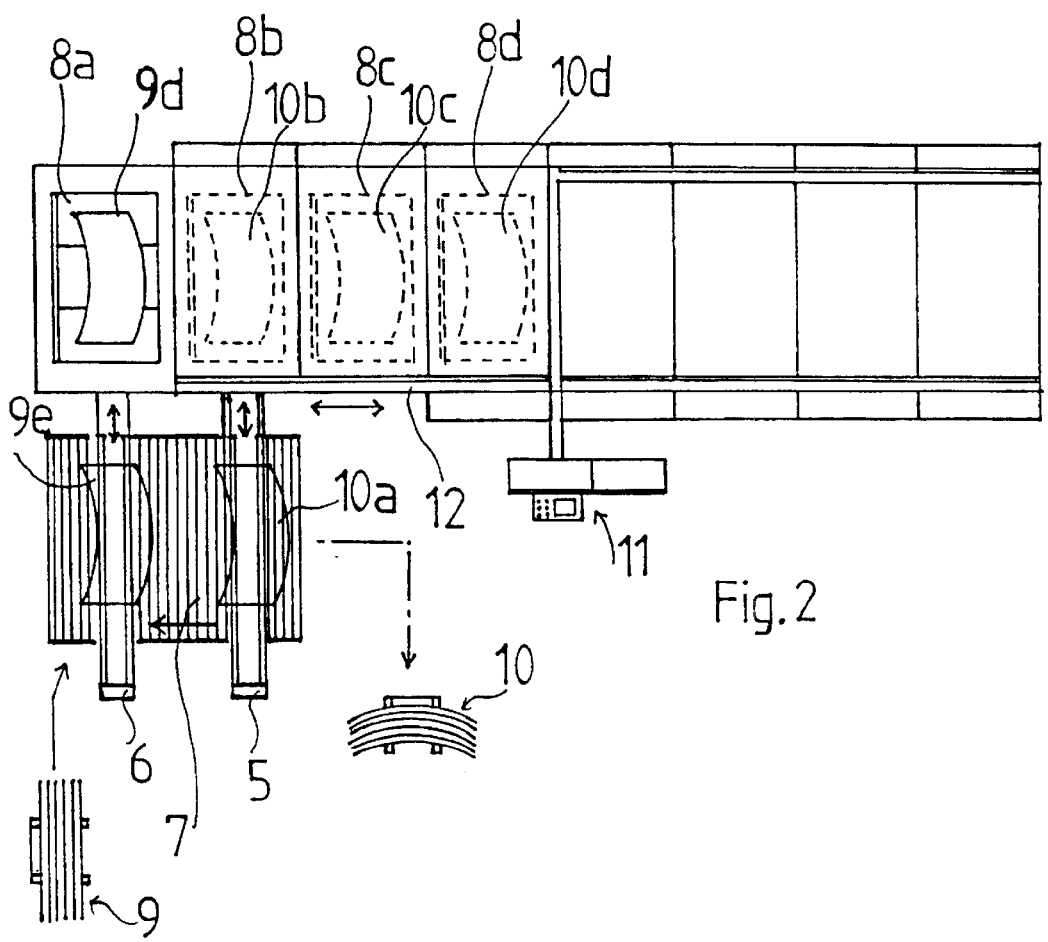

FIG. 2 is schematic view of a furnace embodiment from above furnished with the arrangement as per this invention.

FIG. 1 shows a serial furnace from one side, which has an upper rail 3 and an lower rail 4. Glass sheet 9 for bending travels in mould carriage 8 on the upper rail from section 2a to another section 2b, 2c etc. On the upper rail the glass sheet is heated up to bending temperature. On the lower rail bent glass sheets 10 travel in mould carriage 8 via cooling sections to the unloading and loading end, which comprises also the lift section. Sections on top of one another are marked with section numbers 2a, 2b, 2c etc. During the cycle of the process each mould carriage stops in the respective section. The cycle includes the transmission time of one carriage and the stop time of one carriage.

FIG. 2 shows the furnace from above. On the lower rail 4 bent glass sheets 10 travel in mould carriages 8 in turns to section 2a. In the embodiment of FIG. 2 from section 2a lower rail the mould with bent glass sheet 10b is collected by transmitter 5 aside from rail 4 as soon as the carriage has during the shift-down cycle arrived at and stopped in section 2a. When mould and glass sheet 10b have been brought by transmitter 5 to side station 7, the bent glass sheet is removed from mould. The former mould has moved to side station 7 away from the location of transmitter 5 to the location of transmitter 6. When a glass sheet has been loaded into the former mould and the respective mould has been brought by transmitter 6 to the lift section 1 lower part, the mould that has brought the glass sheet can move over to the transmitter 6 line and a glass sheet from store 9 can be loaded into it.

When the mould carriage including mould and glass sheet 9d has been elevated to upper rail 3 by the lift in lift section 1, the empty mould carriage 8b, which has brought glass sheet 10b, can move over from section 2a into the lift in order to wait for mould and the glass sheet 9e therein for transmission by means of transmitter 6.

In the arrangement as per this invention, in the construction in FIG. 2 there are more moulds 1 than mould carriages 8. The extra mould, (each in its turn), is in side station 7, whereby the unloading and loading situation causes leads to that that the mould to be returned from station 7 cannot return to the same carriage, out of which it was collected to the station. Thanks to the extra mould the available unloading and loading time grows remarkably.

Example of a furnace, the capacity of which has been raised by means of the arrangement as per this invention to a quantity of 100 pieces per hour Cycle length then 3600 sec./100 pcs36 sec. each Mould pull-out time by transmitter 5 ab. 13 sec. in addition moving mould over from transmitter 5 location to transmitter 6 ab. 5 sec.

Time remaining 36 sec.−28 sec. gives 18 sec.

Transmitter 6 operation time is also 13 sec., so in station 7 there are available the remaining net times (18+18) from two 36 second cycles, i.e. 36 sec. for loading.

Thus at both transmitters 5 and 6 the mould can stay for 18 sec., i.e. 36 sec. unloading and loading time remains for the same mould. This can be reached since the arrangement includes an extra mould. If the capacity is 60 pieces per hour, 60 sec.−18 sec.=42 sec. time will remain for unloading and loading.

It is to be noticed that the time needed for moving the carriages from one section to another needs not to be taken into consideration. Anyhow, carriages 8 are stopped so long that transmitter 5 can take the mould from the carriage and lift a little before transmission. The carriage is even ready to start forward at once after lifting. On the other hand, transmitter 6 cannot let the mould down onto the carriage the on the lift section lower rail before the carriage has stopped in the section. Unloading and loading of glass sheets into mould are both done in their respective side station location, where the work will progress rapidly.

In side station 7 there is a conveyor taking the moulds from transmitter 5 to transmitter 6. In the example in FIG. 2 transmitter 5 is at section 2a, but it can as well be at section 2b or section 2c. The section end must then be open for mould collection. If mould and glass sheet are collected from sections 2b or 2c, there will, naturally, be still more unloading and loading time available, as much as one cycle or two cycles. In these solutions an increase of the mould quantity will also come into question, for instance 2 or 3 moulds more than the quantity of mould carriages.

Most suitably transmitters are fork trucks with forks lifting the mould and taking it to side station 7. The most natural location of the other transmitter is to shift the loaded mould over to lift section 1. The first transmitter 5 works in any section 2a, 2b, 2c before lift section 1.

In addition to the remarkably increase of capacity, the side station comprised in the invention brings forth also other advantages, since unloading and loading become more simple to carry out, when the glass sheets move mainly only in, one direction in process. In the former solution from the same mould in the lift a glass sheet had both to be removed and to be brought there in a very short time. The furnace construction includes a control centre 11 to steer the furnace operation. Among other things, the control of the timing of transmitter 5 and 6 functions can be made automatic and synchronous with the rail cycle.

What is claimed is:

1. An apparatus comprising a multisection glass sheet bending furnace where the glass sheets travel in cycles along upper rail (3) and lower rail (4) from one section to the next section in molds on mold carriages (8) wherein the improvement comprises means for loading glass sheets (9) and unloading bent glass sheets (10) comprising:

a side station (7) for receiving bent glass sheets (10) resting on molds;

a first transmitter (5) for bringing the glass sheets (10) resting on molds to the station (7);

a second transmitter (6) for returning the molds with glass sheets (10) to the carriages (8) located on rail (4); and conveying equipment to shift the molds from the first transmitter (5) to the second transmitter (6);

wherein the side station (7) allows the functions of loading glass sheets (9) and unloading bent glass sheets (10).

2. The apparatus according to claim 1 wherein the number of molds is greater than the number of mold carriages (8).

3. The apparatus according to claim 1 wherein at least one mold carriage (8) is movable on the rail (4) from one section to the next one without mold.

4. The apparatus according to claim 1 wherein when a mold is moved from a first mold carriage (8) over to the side station (7), the mold is shiftable on the rail (4) to a second mold carriage (8) that arrives after the first mold carriage.

5. An apparatus according to claim 1 wherein the second transmitter (6) shifts the mold to a carriage (8), which is in a lower section of lift section (1) which is contained in the furnace.

6. An apparatus according to claim 1 wherein each mold in its turn is moved off the rail (4) in the furnace for a substantially longer time than the duration of one cycle of the rail.

* * * * *